(12) United States Patent
Yuan et al.

(10) Patent No.: US 11,624,341 B2
(45) Date of Patent: Apr. 11, 2023

(54) EXHAUST GAS RECIRCULATION CONTROL IN AN INTERNAL COMBUSTION ENGINE

(71) Applicants: Tula Technology, Inc., San Jose, CA (US); Cummins Inc., Columbus, IN (US)

(72) Inventors: Xin Yuan, Palo Alto, CA (US); Shikui Kevin Chen, Leander, TX (US); Jennifer K. Light-Holets, Greenwood, IN (US); Scott R. Bardakjy, Columbus, IN (US)

(73) Assignees: Tula Technology, Inc., San Jose, CA (US); Cummins Inc., Columbus, IN (US)

( * ) Notice: Subject to any disclaimer, the term of this patent is extended or adjusted under 35 U.S.C. 154(b) by 0 days.

(21) Appl. No.: 17/883,338

(22) Filed: Aug. 8, 2022

(65) Prior Publication Data

US 2022/0372925 A1  Nov. 24, 2022

Related U.S. Application Data

(63) Continuation of application No. 17/110,917, filed on Dec. 3, 2020, now Pat. No. 11,441,519.

(Continued)

(51) Int. Cl.
*F02M 26/43* (2016.01)
*F02D 41/00* (2006.01)
(Continued)

(52) U.S. Cl.
CPC ......... *F02M 26/43* (2016.02); *F02D 41/0052* (2013.01); *F02D 41/0072* (2013.01);
(Continued)

(58) Field of Classification Search
CPC .... F02M 26/43; F02M 26/05; F02D 41/0052; F02D 41/0072
(Continued)

(56) References Cited

U.S. PATENT DOCUMENTS 5,553,575 A    9/1996  Beck et al.
6,601,387 B2 * 8/2003  Zu ..................... F02D 41/0072
                                             123/568.21
(Continued)

FOREIGN PATENT DOCUMENTS

CN    102121423 A    7/2011
CN    102216598 A   10/2011
(Continued)

OTHER PUBLICATIONS

Chinese Office Action dated Oct. 20, 2022, from Chinese Application No. 202080087721.4.
(Continued)

*Primary Examiner* — Shafiq Mian
(74) *Attorney, Agent, or Firm* — Beyer Law Group LLP

(57) ABSTRACT

A system and method of integrating an engine having dynamic skip fire control with an exhaust gas recirculation system in a turbocharged internal combustion engine is described. An engine control system determines an appropriate firing pattern based at least in part on a desired exhaust gas recirculation flow rate. Signals from sensors in the intake manifold and exhaust system may also be used as part of a feedback loop to determine a desired exhaust gas recirculation flow rate.

20 Claims, 3 Drawing Sheets

Related U.S. Application Data

(60) Provisional application No. 62/949,216, filed on Dec. 17, 2019.

(51) Int. Cl.
*F02M 26/05* (2016.01)
*F02D 41/14* (2006.01)

(52) U.S. Cl.
CPC ..... *F02D 41/0087* (2013.01); *F02D 41/1461* (2013.01); *F02M 26/05* (2016.02); *F02D 2200/0406* (2013.01); *F02D 2200/101* (2013.01)

(58) Field of Classification Search
USPC .......................................... 60/605.2; 701/108
See application file for complete search history.

(56) References Cited

U.S. PATENT DOCUMENTS

| | | | |
|---|---|---|---|
| 7,577,511 B1 | 8/2009 | Tripathi et al. | |
| 7,849,835 B2 | 12/2010 | Tripathi et al. | |
| 7,886,715 B2 | 2/2011 | Tripathi et al. | |
| 7,913,675 B2 | 3/2011 | Bailey et al. | |
| 7,954,474 B2 | 6/2011 | Tripathi et al. | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,336,521 B2 | 12/2012 | Tripathi et al. | |
| 8,381,700 B2 | 2/2013 | Ramappan et al. | |
| 8,449,743 B2 | 5/2013 | Sekiya et al. | |
| 8,511,281 B2 | 8/2013 | Tripathi et al. | |
| 8,616,181 B2 | 12/2013 | Sahandiefanjani et al. | |
| 8,640,457 B2 * | 2/2014 | Gokhale ............... F02M 26/33 60/602 | |
| 8,869,773 B2 | 10/2014 | Tripathi et al. | |
| 8,904,786 B2 * | 12/2014 | Hayman ................. F02B 33/34 123/568.13 | |
| 9,086,020 B2 | 7/2015 | Pirjaberi et al. | |
| 9,316,165 B2 | 4/2016 | Chukuwuemeka et al. | |
| 9,399,964 B2 | 7/2016 | Younkins et al. | |
| 9,512,794 B2 * | 12/2016 | Serrano ............... F02D 41/0002 | |
| 9,528,446 B2 | 12/2016 | Pirjaberi et al. | |
| 9,587,589 B2 * | 3/2017 | Kemmerling ........... F02B 39/10 |
| 9,631,581 B2 * | 4/2017 | Sankara ............... F02D 41/0082 |
| 9,689,327 B2 | 6/2017 | Younkins et al. |
| 9,745,905 B2 | 8/2017 | Pirjaberi |
| 9,777,658 B2 | 10/2017 | Nagashima |
| 9,790,867 B2 * | 10/2017 | Carlson ............ F02M 35/10222 |
| 10,060,368 B2 * | 8/2018 | Pirjaberi ............. F02D 41/3058 |
| 10,100,761 B2 | 10/2018 | Karnik et al. |
| 10,233,856 B2 | 3/2019 | Dudar |
| 10,267,249 B2 | 4/2019 | Karunaratne |
| 10,344,692 B2 | 7/2019 | Nagashima |
| 2014/0034014 A1 | 2/2014 | Blythe et al. |
| 2014/0102077 A1 | 4/2014 | Riffle |
| 2014/0234352 A1 * | 8/2014 | Chen ..................... C12N 15/85 435/328 |
| 2015/0135680 A1 | 5/2015 | Ancimer |
| 2015/0192080 A1 * | 7/2015 | Younkins ................ F02P 17/12 73/114.62 |
| 2015/0354509 A1 | 12/2015 | Sankara et al. |
| 2016/0312721 A1 | 10/2016 | DeSmet |
| 2017/0122168 A1 | 5/2017 | Angst |
| 2017/0342921 A1 | 11/2017 | Pirjaberi et al. |
| 2018/0238248 A1 | 8/2018 | Karnik et al. |
| 2019/0040826 A1 * | 2/2019 | McCarthy, Jr. ..... F02D 41/0077 |
| 2019/0234352 A1 * | 8/2019 | Deb ........................ F02M 26/49 |
| 2020/0400044 A1 | 12/2020 | Hasan |
| 2021/0180544 A1 | 6/2021 | Yuan |
| 2021/0262404 A1 * | 8/2021 | Lana ..................... F02P 5/1516 |

FOREIGN PATENT DOCUMENTS

| | | |
|---|---|---|
| CN | 108457756 A | 8/2018 |
| WO | WO 2010/006311 | 1/2010 |
| WO | WO 2011/085383 | 7/2011 |

OTHER PUBLICATIONS

International Search Report and Written Opinion dated Mar. 3, 2021 from International Application No. PCT/US20/62897.
Office Action dated Dec. 27, 2021 from U.S. Appl. No. 17/110,917.
Notice of Allowance dated May 13, 2022 from U.S. Appl. No. 17/110,917.

* cited by examiner

| cycle # | Cylinder # | | | | | |
|---|---|---|---|---|---|---|
| | 1 | 5 | 3 | 6 | 2 | 4 |
| 1 | 0 | 0 | 0 | 0 | 0 | 0 |
| 2 | 1 | 0 | 0 | 0 | 0 | 0 |
| 3 | 0 | 1 | 0 | 0 | 0 | 0 |
| 4 | 0 | 0 | 1 | 0 | 0 | 0 |
| 5 | 0 | 0 | 0 | 1 | 0 | 0 |
| 6 | 0 | 0 | 0 | 0 | 1 | 0 |
| 7 | 0 | 0 | 0 | 0 | 0 | 1 |

| # | Firing fraction | Pattern designation | \- 1st engine cycle - | | | | | | Firing sequence | \- 2nd engine cycle - | | | | | |
|---|---|---|---|---|---|---|---|---|---|---|---|---|---|---|---|
| | | | Cyl. 1 | Cyl. 5 | Cyl. 3 | Cyl. 6 | Cyl. 2 | Cyl. 4 | Cyl. 1 | Cyl. 5 | Cyl. 3 | Cyl. 6 | Cyl. 2 | Cyl. 4 | Cyl. 1 |
| 1 | 0 | A | 0 | 0 | 0 | 0 | 0 | 0 | repeat | | | | | | |
| 2 | 1/7 | - | - | - | - | - | - | - | - | | | | | | |
| 3 | 1/6 | A | 1 | 0 | 0 | 0 | 0 | 0 | repeat | | | | | | |
| 4 | 1/6 | B | 0 | 1 | 0 | 0 | 0 | 0 | repeat | | | | | | |
| 5 | 1/6 | C | 0 | 0 | 1 | 0 | 0 | 0 | repeat | | | | | | |
| 6 | 1/6 | D | 0 | 0 | 0 | 1 | 0 | 0 | repeat | | | | | | |
| 7 | 1/6 | E | 0 | 0 | 0 | 0 | 1 | 0 | repeat | | | | | | |
| 8 | 1/6 | F | 0 | 0 | 0 | 0 | 0 | 1 | repeat | | | | | | |
| 9 | 1/5 | - | - | - | - | - | - | - | - | | | | | | |
| 10 | 1/4 | A | 1 | 0 | 0 | 0 | 1 | 0 | 0 | 0 | 1 | 0 | 0 | 0 | repeat |
| 11 | 1/4 | B | 0 | 1 | 0 | 0 | 0 | 1 | 0 | 1 | 0 | 0 | 0 | 1 | repeat |
| 12 | 2/7 | - | - | - | - | - | - | - | - | | | | | | |
| 13 | 1/3 | A | 1 | 0 | 0 | 1 | 0 | 0 | repeat | | | | | | |
| 14 | 1/3 | B | 0 | 1 | 0 | 0 | 1 | 0 | repeat | | | | | | |
| 15 | 1/3 | C | 0 | 0 | 1 | 0 | 0 | 1 | repeat | | | | | | |
| 16 | 2/5 | - | - | - | - | - | - | - | - | | | | | | |
| 17 | 3/7 | - | - | - | - | - | - | - | - | | | | | | |
| 18 | 1/2 | A | 1 | 0 | 1 | 0 | 1 | 0 | repeat | | | | | | |
| 19 | 1/2 | B | 0 | 1 | 0 | 1 | 0 | 1 | repeat | | | | | | |
| 20 | 4/7 | - | - | - | - | - | - | - | - | | | | | | |
| 21 | 3/5 | - | - | - | - | - | - | - | - | | | | | | |
| 22 | 2/3 | A | 0 | 1 | 1 | 0 | 1 | 1 | repeat | | | | | | |
| 23 | 2/3 | B | 1 | 0 | 1 | 1 | 0 | 1 | repeat | | | | | | |
| 24 | 2/3 | C | 1 | 1 | 0 | 1 | 1 | 0 | repeat | | | | | | |
| 25 | 5/7 | - | - | - | - | - | - | - | - | | | | | | |
| 26 | 3/4 | A | 0 | 1 | 1 | 1 | 0 | 1 | 1 | 1 | 0 | 1 | 1 | 1 | repeat |
| 27 | 3/4 | B | 1 | 0 | 1 | 1 | 1 | 0 | 1 | 0 | 1 | 1 | 1 | 0 | repeat |
| 28 | 4/5 | - | - | - | - | - | - | - | - | | | | | | |
| 29 | 5/6 | A | 0 | 1 | 1 | 1 | 1 | 1 | repeat | | | | | | |
| 30 | 5/6 | B | 1 | 0 | 1 | 1 | 1 | 1 | repeat | | | | | | |
| 31 | 5/6 | C | 1 | 1 | 0 | 1 | 1 | 1 | repeat | | | | | | |
| 32 | 5/6 | D | 1 | 1 | 1 | 0 | 1 | 1 | repeat | | | | | | |
| 33 | 5/6 | E | 1 | 1 | 1 | 1 | 0 | 1 | repeat | | | | | | |
| 34 | 5/6 | F | 1 | 1 | 1 | 1 | 1 | 0 | repeat | | | | | | |
| 35 | 6/7 | - | - | - | - | - | - | - | - | | | | | | |
| 36 | 1 | A | 1 | 1 | 1 | 1 | 1 | 1 | repeat | | | | | | |

EXHAUST GAS RECIRCULATION CONTROL IN AN INTERNAL COMBUSTION ENGINE

CROSS-REFERENCE TO RELATED APPLICATIONS

This application is a continuation of U.S. application Ser. No. 17/110,917 filed Dec. 3, 2020, which claims priority of U.S. Application No. 62/949,216, filed on Dec. 17, 2019, which is incorporated herein by reference in its entirety.

FIELD OF DESCRIBED EMBODIMENTS

The described embodiments relate generally to internal combustion engines and to methods and arrangements for controlling internal combustion engines to operate more efficiently with lower levels of noxious emissions. More particularly, a system and method of integrating an engine having dynamic skip fire control with an exhaust gas recirculation system in a turbocharged, skip fired controlled engine is described.

BACKGROUND

The output of many internal combustion engines is controlled by adjusting the fuel delivered to each fired cylinder. An engine control unit (ECU) directs delivery of the appropriate fuel charge for the commanded torque and mass air charge (MAC). Gasoline fueled engines generally operate with an air/fuel ratio at or near stoichiometry to facilitate conversion of harmful pollutants to more benign compounds in a 3-way catalytic converter. Other engines, such as Diesel engines, generally do not maintain a stoichiometric air/fuel ratio but operate over a broad range of lean air/fuel ratios. Diesel engines often recirculate some of the exhaust gas back into an intake manifold that feeds air into the engine's cylinders. This exhaust gas dilution lowers the peak combustion temperature, reducing the production and emission of noxious $NO_x$ compounds.

Over the years there have been a wide variety of efforts made to improve the fuel efficiency of internal combustion engines. One approach that has gained popularity is to vary the displacement of the engine. Most commercially available variable displacement engines effectively "shut down" or "deactivate" some of the cylinders during certain low-load operating conditions. When a cylinder is "deactivated", its piston typically still reciprocates; however, neither air nor fuel is delivered to the cylinder, so the piston does not deliver any net power. Since the cylinders that are shut down do not deliver any power, the proportional load on the remaining cylinders is increased, thereby allowing the remaining cylinders to operate with improved fuel efficiency and increased exhaust temperature. Also, a reduction in pumping losses improves overall engine efficiency resulting in further improved fuel efficiency.

Another method of controlling internal combustion engines is skip fire control where selected combustion events are skipped during operation of an internal combustion engine so that other working cycles operate at better efficiency and/or higher exhaust temperature. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. From an overall engine perspective, skip fire control sometimes results in successive engine cycles having a different pattern of skipped and fired cylinders. This is contrasted with conventional variable displacement engine operation in which a fixed set of the cylinders are deactivated during certain low-load operating conditions. With skip fire control, cylinders are also preferably deactivated during skipped working cycles in the sense that air is not pumped through the cylinder and no fuel is delivered and/or combusted during skipped working cycles. Cylinder deactivation requires a valve deactivation mechanism to deactivate either or both the intake and/or exhaust valve during skipped working cycles. One of the Applicants, Tula Technology Inc., has filed a number of patent applications generally directed at dynamic skip fire control. These include U.S. Pat. Nos. 7,849,835; 7,886,715; 7,954,474; 8,099,224; 8,131,445; 8,131,447; 8,336,521; 8,449,743; 8,511,281; 8,616,181; 8,869,773; 9,086,020; 9,528,446; 9,689,327 and 9,399,964.

SUMMARY

In some embodiments a method of selecting a firing pattern in a skip fire controlled internal combustion engine is described. The engine has an intake manifold and an exhaust system. The method determines a desired exhaust gas recirculation flow rate and a position of an exhaust gas recirculation valve. Based at least in part on the desired exhaust gas recirculation flow rate and the position of the exhaust gas recirculation valve a firing pattern is selected.

In other embodiments, a skip fire controlled, turbocharged, internal combustion engine is described. The engine has an intake manifold, an exhaust gas recirculation system, and an exhaust system having at least two exhaust manifolds. An exhaust gas recirculation feed line is connected to the exhaust system. The exhaust gas circulation feed line has a more direct fluid connection to a first exhaust manifold than to a second exhaust manifold. An engine control system determines a firing pattern based at least in part on a desired exhaust gas recirculation flow rate.

BRIEF DESCRIPTION OF THE DRAWINGS

The embodiments will be readily understood by the following detailed description in conjunction with the accompanying drawings, wherein like reference numerals designate like structural elements, and in which:

FIG. 4 is a table showing firing patterns for firing fractions having a denominator equal to or less than seven (7).

DESCRIBED EMBODIMENTS

In this patent application, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

As discussed above, skip fire controlled engines deactivate cylinders when they are not needed to generate a requested torque output from the engine. Cylinder deactivation reduces engine pumping losses and generally results in more efficient combustion in fired working cycles. Cylinder deactivation also allows better control of exhaust gas temperature, which is especially important in Diesel engines where lean burn combustion may result in exhaust temperatures too low for efficient removal of noxious emissions by an aftertreatment system.

Figures 1, 2:
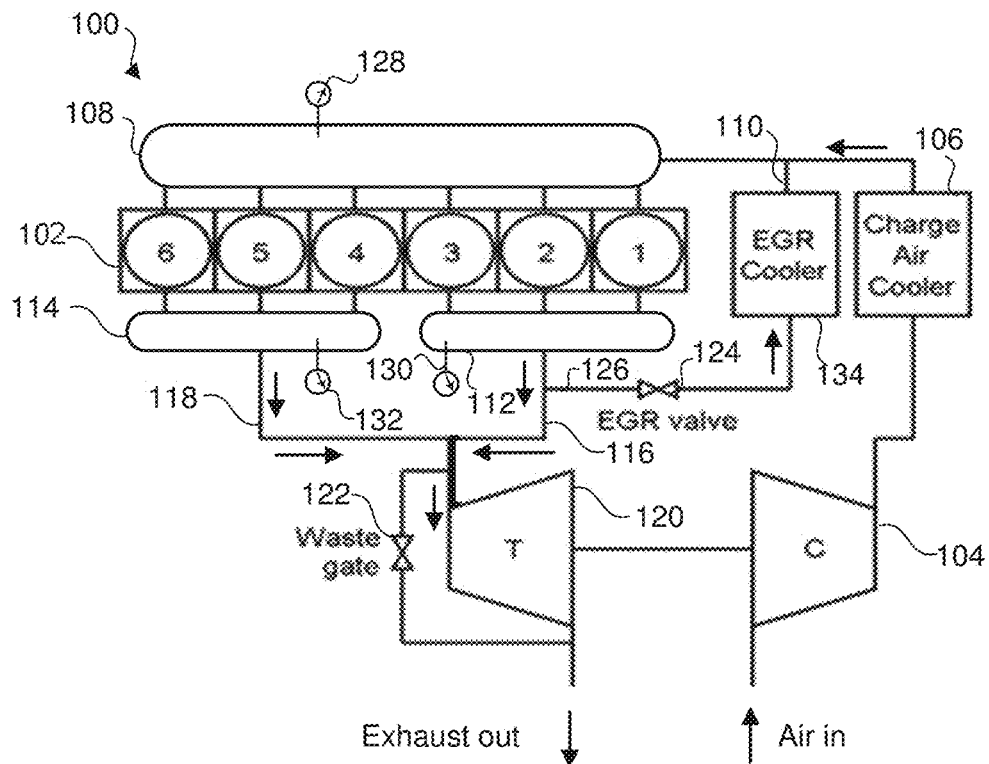
FIG. 1 schematically shows an exemplary turbocharged internal combustion engine.
FIG. 2 is a table depicting skipped and fired cylinders for a firing fraction of ⅓ over multiple engine cycles.

FIG. 1 shows such an exemplary turbocharged internal combustion engine 100 with an exhaust gas recirculation (EGR) system. The engine depicted in FIG. 1 has an in-line 6-cylinder engine block 102 with each of the cylinders labeled as 1 through 6. Air is inducted into the cylinders through a compressor 104 that boosts the air pressure in an intake manifold 108 above atmospheric pressure. An charge air cooler 106 may be situated in the air flow path between the compressor 104 and intake manifold 108 to cool the incoming compressed air. The output of the charge air cooler 106 may be fed into the intake manifold 108. Also feeding into the intake manifold 108 is an exhaust gas recirculation line 110. A mixture of air and recirculated exhaust gas residing in the intake manifold 108 is inducted into each cylinder through one or more intake valves (not shown in FIG. 1). After being inducted into the cylinders, the air/exhaust gas mixture may be mixed with fuel in the cylinders and combusted generating exhaust gas. The exhaust gas is vented through one or more exhaust valves (not shown in FIG. 1) into a first exhaust manifold 112 or a second exhaust manifold 114. The first exhaust manifold 112 receives exhaust from cylinders 1 to 3. The second exhaust manifold 114 receives exhaust from cylinders 4 to 6. Exhaust lines 116 and 118 running from the first exhaust manifold 112 and the second exhaust manifold 114, respectively, merge and direct the exhaust to a turbine 120. Exhaust gas passing through the turbine 120 drives the compressor 104. After leaving the turbine 120, exhaust gas may pass through one or more aftertreatment elements and/or a muffler (not shown in FIG. 1) before being vented to the atmosphere. An optional waste gate 122 may direct a controlled portion of the exhaust gas around the turbine 120 by opening the waste gate 122 a desired amount. An EGR feed line 126 may be connected to the first exhaust line 116. The EGR feed line 126 directs a portion of the exhaust gas to EGR valve 124. EGR valve 124 may direct a controlled portion of the exhaust gas back into the exhaust gas recirculation line 110 through an EGR cooler 134. The EGR cooler 134 cools the exhaust gas as it passes through the EGR cooler 134. By adjusting a position of the EGR valve 124 more or less exhaust gas will flow into the exhaust gas recirculation line 110. By opening the EGR valve 124 more exhaust gas will flow into the intake manifold 108. Conversely, by closing the EGR valve 124 less exhaust gas will flow into exhaust gas recirculation line 110. From the exhaust gas recirculation line 110, the exhaust gas may flow back into the intake manifold 108 where it will be mixed with air and inducted into the engine's cylinders as previously described. The EGR feed line 126, EGR valve 124, EGR cooler 134, and exhaust gas recirculation line 110 may be considered as an EGR system. The turbine 120, compressor 104, and optional waste gate 122 may be considered as a turbocharger system. The first exhaust manifold 112, the second exhaust manifold 114, the first exhaust line 116, the second exhaust line 118, the turbine 120, the EGR feed line 126, the aftertreatment elements (not shown in FIG. 1), and the optional waste gate 122 may be considered as an exhaust system.

The turbine 120 may be part of a variable geometry or variable nozzle turbocharger system. In this case, an internal mechanism within the turbine 120 alters a gas flow path through the turbine 120 to optimize turbine operation as the exhaust gas flow rate through the turbine 120 changes. If the turbine 120 is part of a variable geometry or variable nozzle turbocharger system, the waste gate 122 may not be required.

Various sensors may optionally be positioned in various locations within the engine 100. For example, sensor 128 may provide a signal related to conditions within the intake manifold 108. Sensor 128 may provide a signal related to the oxygen level in the intake manifold, which provides a measure of the ratio of exhaust gas to air within the intake manifold 108. The sensor 128 signal may be used in a feedback loop as described below. Additional intake manifold sensors may include, but are not limited to, a pressure sensor, a temperature sensor, and a humidity sensor. Similarly, one or more sensors 130 and 132 may provide signals related to conditions at various locations within the exhaust system. For example, sensor 130 may monitor conditions in the first exhaust manifold 112 and sensor 132 may monitor conditions in the second exhaust manifold. The sensors 130 and 132 may provide a signal related to the oxygen level in the first exhaust manifold and second exhaust manifold, respectively. Additional exhaust system sensors may include, but are not limited to, a pressure sensor, a temperature sensor, and a $NO_x$ sensor. These exhaust system sensors may be distributed at different points in the exhaust system as required.

In operation, the intake manifold pressure can change significantly with speed and load. Typically, it can be as low as ambient pressure (nominally 14.7 pounds per square inch (psi) or 100 kPa absolute) at light loads to as high as 250-300 kPa at peak power. The intake manifold pressure relative to atmospheric pressure is often referred to as a boost pressure. Similarly, an exhaust manifold pressure can also change significantly, from as low as (slightly higher than) ambient pressure (100 kPa) to as high as 300 to 350 kPa at peak power. The exhaust manifold pressure is normally higher than intake manifold pressure, so that exhaust gas can to flow back into the intake manifold 108 resulting in exhaust gas recirculation. The gas pressure entering the turbine 120 must also be above atmospheric pressure for the turbine 120 to operate. Arrows in FIG. 1 illustrate the normal gas flow directions through the engine 100.

Inspection of FIG. 1 shows that the connection point of the EGR feed line 126 is not symmetrically located with respect to the engine's 100 cylinders. Specifically cylinders 1-3 have a much shorter and more direct flow path to the EGR feed line 126 than do cylinders 4-6. This asymmetry in the EGR feed line 126 location may complicate skip fire control, where different cylinders may be skipped or fired depending on the firing pattern. This is especially important for firing patterns where the pattern of firings and skips is fixed for certain cylinders over an extended number of engine cycles. For example, in some firing patterns only some or all of cylinders 1-3 may fire while all of cylinders 4-6 are skipped. Similarly, in other firing patterns only some or all of cylinders 4-6 are fired while all of cylinders 1-3 are skipped. These different firing patterns will influence exhaust gas recirculation flow back into the intake manifold. As such, the firing pattern may be based at least in part on the desired exhaust gas recirculation flow rate and a position of the exhaust gas recirculation valve 124.

To give a specific example, the engine 100 depicted in FIG. 1 may have a cylinder firing order of 1-5-3-6-2-4. A firing fraction of ½ having a most equal spacing between the firings may have two possible firing patterns, i.e. 1-S-3-S-

2-S or S-5-S-6-S 4. Here the "S" in the sequence indicates that the cylinder has been skipped. The firing pattern 1-S-3-S-2-S has three cylinders, cylinders 1, 2, and 3, that vent directly into the first exhaust manifold 112 which has a close fluid connection to the EGR feed line 126. By contrast, the firing pattern S-5 S-6 S-4 has all cylinders venting into the second exhaust manifold 114. As such all these cylinders (4-6) have a more indirect flow path to the EGR feed line 126 than do cylinders 1-3. In fact, the normal flow direction in parts of the exhaust system must be reversed for exhaust gas to flow from the second exhaust manifold 114 into the EGR feed line 126. Such a reversed flow direction is possible, but it will limit the EGR flow rate and cause lags in EGR flow rate adjustment.

To control an EGR flow rate under while the engine 100 is operating in a dynamic skip fire (DSF) mode, the firing pattern at certain firing fractions should be considered. For example, when running firing fraction of ½ described above, the firing pattern 1-S-3-S-2-S will be preferred if a high EGR flow rate is required and the firing pattern S-5-S-6-S-4 could be used a low EGR flow rate is required. Similar consideration would also apply to firing fractions of ¼ and ¾.

To maintain a consistent EGR flow rate, some rotating firing patterns may need to be avoided at certain operating conditions. Here a rotating firing pattern refers to a firing pattern that fires or skips all cylinders. For example, a firing fraction of 1/7 is a rotating firing pattern. A firing fraction of 1/7 fires one of the cylinders that feed into the first exhaust manifold 112 (cylinder 1, 2, or 3) once every 14 firing opportunities. FIG. 2 illustrates the firing pattern resulting from operation at a firing fraction of 1/7. The firings 202 that result in venting exhaust gas more directly into the EGR feed line 126 are highlighted in the table. The irregular nature of the exhaust flow may cause undesirable discontinuities in the EGR flow and thus this firing pattern and firing fraction may be avoided at some engine speeds and loads.

Figure 3:
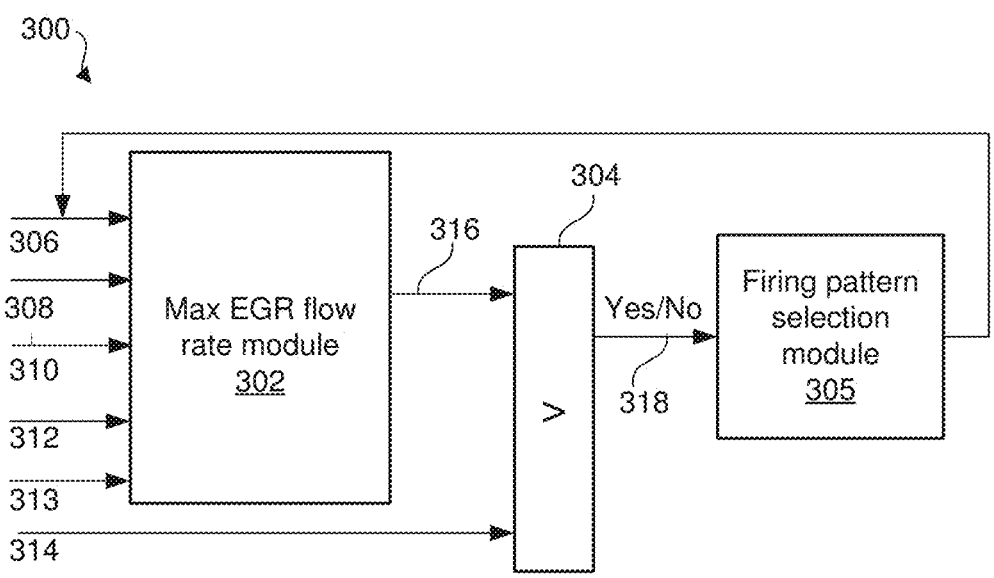
FIG. 3 is a schematic flow diagram of an engine control system.

FIG. 3 is a schematic flow chart that depicts an engine control system 300 according to an embodiment of the current invention. The engine control system 300 may determine an appropriate firing pattern based at least in part on a desired EGR flow rate. Inputs to the engine control system 300 may include a current firing pattern 306, current engine speed 308, current intake manifold boost pressure 310, current exhaust manifold pressure 312 and optionally current valve timing & lift 313 (for engines having adjustable valve timing and/or lift). These parameters determine a rate of gas flow through the engine block 102. In some embodiments, not all these inputs may be required. Based on these parameters a maximum EGR flow rate may be determined in module 302. The maximum EGR flow rate corresponds to the EGR valve 124 being in a fully opened position. A look-up table may be used to determine the maximum EGR flow rate or the maximum EGR flow rate may be calculated based on a model. If a look-up table is used, values between those listed in the look-up table may be determined by interpolation. The maximum EGR flow rate module 302 outputs a maximum EGR flow rate signal 316, which is input into a comparator 304. Another input to the comparator 304 is a desired EGR flow rate signal 314. This signal represents the desired EGR flow rate under the current engine conditions. Limiting $NO_x$ exhaust emissions is a major consideration in determining the desired EGR flow rate. If the maximum EGR flow rate signal 316 is greater than the desired EGR flow rate 314, the comparator 304 may output a logical "yes" on signal line 318. If the maximum EGR flow rate signal 316 is less than the desired EGR flow rate 314, the comparator 304 may output a logical "no" on signal line 318. Signal line 318 may be input into firing pattern selection module 305. If signal line 318 is a logical "yes" the firing pattern may remain in its current state, since the desired EGR flow rate 314 is less than the maximum EGR flow rate 316. If signal line 318 is a logical "no" the firing selection module 305 may select a new firing pattern that allows for a higher EGR flow rate. In the specific example of the engine 100 depicted in FIG. 1, the firing pattern selection module may select firing patterns that more regularly fire cylinders 1-3 as compared to cylinders 4-6.

To better understand operation of the engine control system 300 consider the table 400 in FIG. 4. Table 400 shows 36 different firing patterns associated with firing fractions ranging from 0 to 1. All fractions having a denominator equal to or less than 7 are shown. The firing fraction denominator represents the length of a repeating firing pattern associated with the firing fraction. All firing patterns shown in table 400 have as equal a spacing as possible between fired working cycles. Spacing the fired working cycles out as evenly as possible generally results in lower levels of engine produced noise, vibration, & harshness (NVH). The cylinder firing order is as previously noted, 1-5-3-6-2-4. For firing fractions having rotating firing patterns that cause all the engine's cylinders to skip and fire, no pattern designation is listed and a "-" is listed as to whether any given cylinder is skipped or fired, since whether the cylinder skips or fires varies depending on the engine cycle. For firing patterns having only certain cylinders fired and certain cylinders skipped, a pattern designation is assigned. Some of these firing patterns repeat every engine cycle, designated by "repeat" in column 402, whereas some of these firing patterns repeat every two engine cycles, designated by "repeat" in column 404. Firing patterns that fire a greater number of cylinders 1-3 than cylinders 4-6 are highlighted. These firing patterns may be used when higher EGR flow rates are required.

It should be noted that any number of the skipped cylinders in any of the patterns described in FIG. 4 can also be "pumping" cylinders. With pumping cylinders, the intake and exhaust valves are operated to allow air to pass through the cylinder, but no fuel is provided. Operating at least some of the skipped working cycles as pumping working cycles provides another parameter to adjust the EGR flow rate.

In another embodiment, a signal from an oxygen sensor located in the intake manifold 108 may be used to determine the ratio of exhaust gas to air in the intake manifold 108. If the oxygen level deviates from a desired oxygen level by more than a pre-defined threshold amount, a position of EGR valve 124 may adjusted and/or a firing pattern may be changed. If the oxygen level is high (insufficient EGR flow) a firing pattern that predominately fires cylinders 1-3 rather than cylinders 4-6 may be selected to increase the EGR flow rate. Similarly, if the oxygen level is low (excessive EGR flow) a firing pattern that predominately fires cylinders 4-6 rather than cylinders 1-3 may be selected to decrease the EGR flow rate.

In another embodiment, a signal from an oxygen sensor located in one or both of the exhaust manifolds 112 and 114 may be used to determine the ratio of exhaust gas to air in the exhaust manifold. If the oxygen level deviates from a desired oxygen level by more than a pre-defined threshold amount, a position of EGR valve 124 may adjusted and/or a firing pattern may be changed. If the oxygen level is high (insufficient EGR flow) a firing pattern that predominately fires cylinders 1-3 rather than cylinders 4-6 may be selected to increase the EGR flow rate. Similarly, if the oxygen level is low (excessive EGR flow) a firing pattern that predominately fires cylinders 4-6 rather than cylinders 1-3 may be selected to decrease the EGR flow rate.

In other embodiments, rather placing an oxygen sensor in the intake manifold or exhaust system, a model of the oxygen level at these locations may be used to generate a signal representative of the oxygen level. This signal may be used in an analogous manner as a signal from an oxygen sensor.

In another embodiment, a signal from a $NO_x$ sensor located in the exhaust system may be used to determine a $NO_x$ level in the exhaust gas. If the $NO_x$ level in the exhaust gas exceeds a pre-determined threshold, the EGR valve 124 may be opened and/or firing patterns that predominately fire cylinders 1-3 rather than cylinders 4-6 may be selected to increase the EGR gas flow rate. A model of the $NO_x$ level may be used in place a signal from an $NO_x$ sensor in some embodiments.

While operating the engine using firing patterns with the fired working cycles spaced out as evenly as possible and having a low denominator firing fraction is generally desirable, this mode of operation is not a requirement. Particularly, while operating with light loads and in vehicles with an auxiliary torque source/sink, such as a hybrid powertrain, firing patterns in which the firings are not as evenly spaced as possible may be used. Also, firing fractions having larger denominators, for example, denominators greater than 7 may be used. In some cases the firing fraction denominator may be an integer multiple of the number of cylinders in the engine. In hybrid vehicles an electric motor may be used to mitigate the effects of engine vibration by applying a smoothing torque as described in U.S. Pat. Nos. 9,512,794, 10,060,368, and 10,344,692. In this case, a skip fire algorithm that determines which cylinder to fire and which cylinder to skip may operate with two selection algorithms. A first algorithm may be applied to cylinders directly venting into the first exhaust manifold 112 and a second algorithm may be applied to cylinders directly venting into the second exhaust manifold 114. The first control algorithm and second control algorithm may coordinate with each other to maintain the firing spacings in as even a manner as possible.

As previously described, in the exemplary engine 100 shown in FIG. 1 the first exhaust manifold has a more direct fluid connection to the EGR system than the second exhaust manifold. For example, assume a firing fraction of ⅔ is desired. Inspection of table 400 shows that there are three firing patterns, denoted as A, B & C, that have a firing fraction of ⅔. Each of these patterns fires two cylinders that vent into the first exhaust manifold and fires two cylinders that vent into the second exhaust manifold on each engine cycle. For cylinders venting into the first exhaust manifold, the first algorithm may keep two cylinders firing by dynamically selecting the two firing cylinders and skipping one cylinder each engine cycle. For cylinders venting into the second exhaust manifold, the second algorithm will also fire two cylinders venting into the second exhaust manifold for each engine cycle, while skipping one cylinder each engine cycle. If fewer fired cylinders are needed to supply the requested torque, cylinders controlled by the second algorithm could alternate between firing one or two cylinders each engine cycle, while cylinders controlled by the first algorithm may maintain two fired cylinders per engine cycle. By maintaining the same number of cylinder firings per engine cycle venting into the first exhaust manifold, a more constant EGR flow rate may be maintained.

The firing fraction in the above example is 7/12, i.e. four firings in the first engine cycle and three firings in the second engine cycle. In this case the repeating firing pattern length is twice the number of cylinders in the engine. Engine control by using a combination of the first control algorithm and the second control algorithm may often yield firing patterns having a repeating firing pattern length that is equal to an integer multiple of the number of engine cylinders, wherein the integer multiple is two or more. As in the above example, firing patterns may be selected such that the selected firing pattern reduces engine-cycle-to-engine-cycle fluctuations in a number of cylinder firings venting into the first exhaust manifold to maintain a steadier flow into the EGR system. Firing patterns may also be selected such that the firing pattern has more engine-cycle-to-engine-cycle fluctuations in a number of cylinder firings venting into the second exhaust manifold than a number of cylinder firings venting into the first exhaust manifold, since variation of the exhaust flow into the second exhaust manifold has less impact on the EGR flow rate.

The invention has been described primarily in the context of operating a turbocharged, 4-stroke, internal combustion piston engines suitable for use in motor vehicles. However, it should be appreciated that the described applications are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles. Naturally aspirated engines may also benefit from the invention described herein.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of particular embodiments, there are alterations, permutations, and equivalents, which fall within the scope of these general concepts. It should also be noted that there are alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A method of selecting cylinders to deactivate in an internal combustion engine, the engine having an intake manifold and an exhaust system, comprising:
determining a desired exhaust gas recirculation flow rate;
determining a position of an exhaust gas recirculation valve;
deactivating selected cylinders based at least in part on the desired exhaust gas recirculation flow rate and the position of the exhaust gas recirculation valve; and
determining an engine speed;
determining a boost pressure in the intake manifold; and
regulating a maximum exhaust gas recirculation rate based at least in part on the engine speed and the boost pressure.

2. The method as recited in claim 1, wherein a pattern of firings and deactivation is fixed for certain cylinders over an extended number of engine cycles.

3. The method as recited in claim 1, further comprising:
comparing the desired exhaust gas recirculation flow rate with the maximum exhaust gas recirculation flow rate.

4. The method as recited in claim 3, further comprising:
selecting different cylinders to deactivate if the desired exhaust gas recirculation flow rate exceeds the maximum gas recirculation flow rate.

5. The method as recited in claim 1, further comprising:
determining a valve timing; and
calculating the maximum exhaust gas recirculation rate based at least in part on the valve timing.

6. The method as recited in claim 5, further comprising:
comparing the desired exhaust gas recirculation flow rate with the maximum exhaust gas recirculation flow rate.

7. The method as recited in claim 6, further comprising:
selecting different cylinders to deactivate if the desired exhaust gas recirculation flow rate exceeds the maximum gas recirculation flow rate.

8. The method as recited in claim 1, further comprising:
determining an oxygen level in the intake manifold;
adjusting cylinders to deactivate or the exhaust gas recirculation valve position if the oxygen level deviates from a desired oxygen level by more than a pre-defined threshold amount.

9. The method as recited in claim 1, further comprising:
determining a level of nitrogen oxides in the exhaust system;
adjusting cylinders to deactivate or the exhaust gas recirculation valve position if the level of nitrogen oxides exceeds a pre-defined threshold.

10. The method as recited in claim 1, wherein the selection of cylinders to deactivate does not result in firings being as evenly distributed as possible.

11. The method as recited in claim 1, wherein among cylinders not selected to be deactivated fire, more cylinders that directly vent into a first exhaust manifold are fired than cylinders that do not directly vent into the first exhaust manifold.

12. The method as recited in claim 1, wherein at least one working cycle having a deactivated cylinder is a pumping working cycle.

13. The method as recited in claim 1, wherein selecting cylinders to deactivate reduces engine-cycle-to-engine-cycle fluctuations in a number of cylinder firings venting into the first exhaust manifold.

14. The method as recited in claim 1, wherein selecting cylinders to deactivate has more engine-cycle-to-engine-cycle fluctuations in a number of cylinder firings venting into the second exhaust manifold than a number of cylinder firings venting into the first exhaust manifold.

15. An internal combustion engine, the engine having an intake manifold, an exhaust gas recirculation system, and an exhaust system having at least two exhaust manifolds, the engine comprising:
an exhaust gas recirculation feed line connected to the exhaust system, wherein the exhaust gas circulation feed line has a more direct fluid connection to a first exhaust manifold than to a second exhaust manifold; and
an engine control system configured to:
deactivate at least one cylinder based at least in part on a desired exhaust gas recirculation flow rate;
determine an engine speed;
determine a boost pressure in the intake manifold; and
regulate a maximum exhaust gas recirculation rate based at least in part on the engine speed and the boost pressure.

16. The engine as recited in claim 15, further comprising:
an oxygen sensor located in the intake manifold, wherein a signal from the oxygen sensor is used as part of a feedback loop to determine the desired exhaust gas recirculation flow rate.

17. The engine as recited in claim 15, further comprising:
a nitrogen oxides sensor to measure a level of nitrogen oxides located in the exhaust, wherein a signal from the nitrogen oxides sensor is used as part of a feedback loop to determine the desired exhaust gas recirculation flow rate.

18. An internal combustion engine, the engine having an intake manifold, an exhaust gas recirculation system, and an exhaust system having at least two exhaust manifolds, comprising:
an exhaust gas recirculation feed line connected to the exhaust system, wherein the exhaust gas circulation feed line has a more direct fluid connection to a first exhaust manifold than to a second exhaust manifold; and
an engine control system for selecting cylinders to deactivate based at least in part on a desired exhaust gas recirculation flow rate, wherein the engine control system uses a first control algorithm to select a first set of cylinders to deactivate for cylinders that vent into the first exhaust manifold and a second control algorithm to select a second set of cylinders to deactivate for cylinders that vent into the second exhaust manifold.

19. The engine as recited in claim 18, wherein selecting cylinders to deactivate does not result in firings being as evenly distributed as possible.

20. The engine as recited in claim 18, wherein the engine has a plurality of cylinders and a selected firing pattern has a repeating pattern length that is at least twice a number of cylinders in the engine.

* * * * *